Jan. 9, 1945.  M. AYCOCK  2,366,951

FILTER FOR COFFEE MAKERS

Filed May 20, 1943

INVENTOR
Mark Aycock
BY Philip A. Friedell
ATTORNEY.

Patented Jan. 9, 1945

2,366,951

UNITED STATES PATENT OFFICE 2,366,951

FILTER FOR COFFEE MAKERS

Mart Aycock, Berkeley, Calif.

Application May 20, 1943, Serial No. 487,791

2 Claims. (Cl. 210—162)

This invention, a filter for coffee-makers, is of extremely simple design and construction, filters with maximum efficiency, is everlasting, requires no screen or auxiliary filter elements, is very easily cleaned, and is unbreakable.

The various types of filters for coffee-makers which are available are either fragile, have stabilizing or centering stems in addition to the customary lifting members, have tension or locking devices, of complicated construction requiring the assembling and disassembling of a number of cooperative parts for use and cleaning, require special filter elements to be used with them and which must be frequently renewed or replaced, or any combination of the preceding details.

This filter will never require replacement of any part or the use of any additional element or material, being a simple and single operable unit always ready for use, untarnishable, non-corrodable, and unbreakable.

The objects and advantages of the invention are as follows:

First, to provide a filter for coffee-makers which consists of a single member and which requires no auxiliary parts or elements for efficient filtering.

Second, to provide a filter for coffee-makers, which is of the highest efficiency, rapid and clear filtering to provide a filtrate free of any suspended matter.

Third, to provide a filter as outlined which is of non-corrodable metal construction.

Fourth, to provide a filter as outlined with a spherical filter member seatable on its seat irrespective of its relative position.

Fifth, to provide a filter as outlined in which the spherical member is of sufficient weight to seat perfectly without recourse to any type of locking or tension member, depending weight, centering, or other type of member.

Sixth, to provide a filter as outlined in which the spherical filter member is knurled, serrated, grooved or otherwise provided with extremely fine detents or passages throughout the entire spherical surface, to provide the sole filtering means.

Other objects and advantages of the invention will become apparent as the following description is read on the accompanying drawing, in which.

The invention consists of a sphere or partial sphere 10 of nontarnishable, non-corrodable, relatively heavy material, such as stainless steel, Monel metal, or other metals plated with a nontarnishable, non-corrodable material. For convenience in handling the sphere is provided with a stem or handle 11 terminating in a gripping member 12 so that it can easily and conveniently be removed from or placed on the seat 13.

Figures 1, 2:
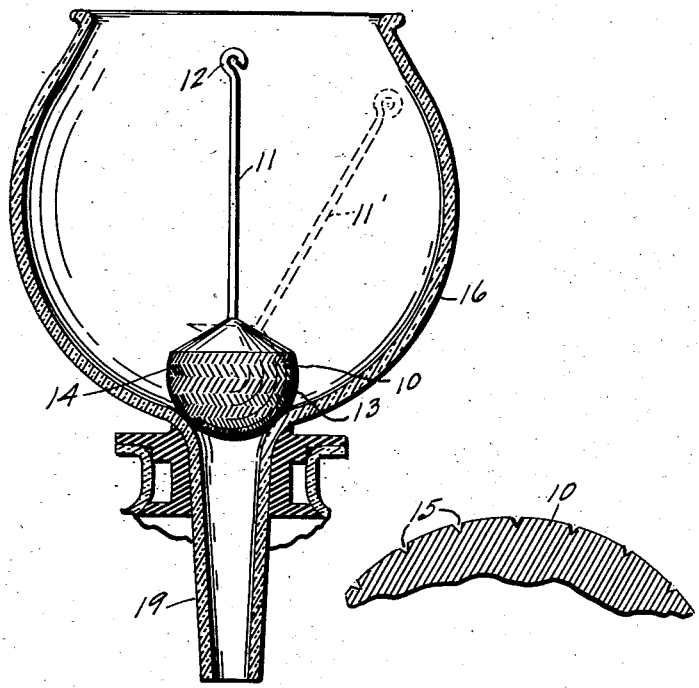
Fig. 1 is a sectional elevation through a conventional coffee-maker of the "Silex" type, showing the invention installed therein.
Fig. 2 is a fragmentary section through any portion of the filter.

The entire surface of the spherical member is serrated, grooved, knurled, or otherwise detented to form extremely fine passages in cooperation with the seat, as indicated at 14. These detents or grooves are preferably of the undulating diagonal type as shown in Fig. 1, but may be of the diamond type shown in Fig. 3, and in cross-section are triangular as shown at 15 in Fig. 2, the depth and area of the groove being such as will not pass the finest particles of coffee while freely passing the liquid.

As is indicated by the dotted figure at 11', it is immaterial what position the filter assumes after the water has been forced into the upper vessel 16 because, irrespective of its position the filter will always seat perfectly on the seat 13 because the passages are uniform through the entire surface of the filter.

Figure 3:
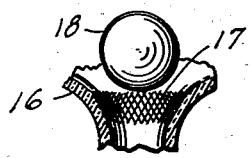
Fig. 3 shows a modification of the invention in which the passages are formed in the seat in the upper vessel of the coffee-maker and with a plain spherical member functioning as the restricting member.

Obviously, the same results can be obtained by serrating or grooving the filter seat as shown at 17 in Fig. 3 and using a smooth sphere 18 of heavy metal. However, with the glass or porcelain seat the serrations or passages might become damaged by chipping, for which reason the arrangement illustrated in Fig. 1 is preferred. A glass, plastic, or low specific gravity metal ball is not efficient because of comparatively low specific gravity. Fast and clear filtering is dependent upon high specific gravity of the filter and minute grooves formed in its surface, so that the superficial spherical surface will be seated directly on the seat, thus restricting passage of liquid to the minute groves alone.

It will be noted that the filter has no depending stem which might become broken or which might cause breakage of the stem 19 which prevents free seating of a filter in any relative position, because in any other than a normal position the stem will contact the inner walls of the stem of the upper vessel of the coffee maker with resultant friction. There is no securing, locking or tensioning means, no auxiliary parts, no corrosion to guard against. The filter is extremely easy to clean, is unbreakable and everlasting.

The filter will seat perfectly irrespective of its relative position, to form efficient filtering passages of such small area as to retain even the finest particles of coffee, to provide a perfectly clear filtrate free of suspensions or sediment.

It will be understood that variations in construction, form, and arrangement which variations are consistent with the appended claims, may be resorted to without detracting from the spirit or scope of the invention or sacrificing any of the advantages thereof.

I claim:

1. A filter for a vacuum coffee maker having a circular filter seat; a filter member formed of relatively high specific gravity material and having a spherical surface throughout the major portion of its extent with serrations formed throughout the entire spherical surface for forming passages between said member and said seat for passing filtrate while retaining all solids and suspensions irrespective of the relative position of said member on the seat; said member having a handle element extending upwardly from the non-spherical portion of the member for replacement and removal of the member while permitting free action of said member while in use to seat on said seat in any relative position throughout its spherical surface.

2. A filter formed of non-corrodable metal of relatively high specific gravity and having a spherical surface throughout the major portion and with a handle extending upwardly from the remaining portion for manipulation of said filter element when in use and for removal and replacement thereof at will, and with the entire spherical surface provided with minute grooves to form minute passages in cooperation with the filter seat of a vacuum coffee maker for passage of filtrate while retaining all solids and suspensions irrespective of the relative position of the element on the seat; said handle being unrestrained in said coffee maker while the element if in use and thus leaving the filter element free to seat in any relative position throughout its spherical surface.

MART AYCOCK.